United States Patent
Li et al.

(10) Patent No.: US 11,234,260 B2
(45) Date of Patent: Jan. 25, 2022

(54) METHOD FOR TRANSMITTING UPLINK CONTROL INFORMATION AND MOBILE STATION

(71) Applicant: NTT DOCOMO, INC., Tokyo (JP)

(72) Inventors: Huiling Li, Beijing (CN); Xin Wang, Beijing (CN); Chongning Na, Beijing (CN); Runxin Wang, Beijing (CN); Yuichi Kakishima, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 24 days.

(21) Appl. No.: 16/645,944

(22) PCT Filed: Jul. 4, 2018

(86) PCT No.: PCT/CN2018/094465
§ 371 (c)(1),
(2) Date: Mar. 10, 2020

(87) PCT Pub. No.: WO2019/047603
PCT Pub. Date: Mar. 14, 2019

(65) Prior Publication Data
US 2020/0281013 A1    Sep. 3, 2020

(30) Foreign Application Priority Data

Sep. 10, 2017    (CN) .................... 201710809353.X

(51) Int. Cl.
*H04W 72/12*    (2009.01)
*H04B 7/06*    (2006.01)
*H04W 72/04*    (2009.01)

(52) U.S. Cl.
CPC ...... *H04W 72/1284* (2013.01); *H04B 7/0626* (2013.01); *H04W 72/0413* (2013.01);
(Continued)

(58) Field of Classification Search
CPC ......... H04W 72/1284; H04W 72/0413; H04W 72/1268; H04W 7/0639; H04W 72/12;
(Continued)

(56) References Cited

U.S. PATENT DOCUMENTS

| 9,775,136 B2* | 9/2017 | Kim .................. H04L 5/0044 |
| 2015/0043462 A1* | 2/2015 | Hwang ............... H04L 1/1671 370/329 |

(Continued)

FOREIGN PATENT DOCUMENTS

| CN | 102263617 A | 11/2011 |
| CN | 105391479 A | 3/2016 |
| WO | 2017039166 A1 | 3/2017 |

OTHER PUBLICATIONS

International Search Report issued in PCT/CN2018/094465, dated Sep. 27, 2018 (13 pages).

(Continued)

*Primary Examiner* — Danh C Le
(74) *Attorney, Agent, or Firm* — Osha Bergman Watanabe & Burton LLP

(57) ABSTRACT

A method is presented for transmitting uplink control information and a mobile station. The method for transmitting the uplink control information includes: adding padding bits to initial control information to generate uplink control information, where the initial control information includes first information having a same number of bits for RANKs of different channel matrices and second information having a same or different number of bits for RANKs of different channel matrices; and transmitting the uplink control information.

4 Claims, 7 Drawing Sheets

(52) U.S. Cl.
CPC ....... *H04W 72/1268* (2013.01); *H04B 7/0639* (2013.01); *H04B 7/0645* (2013.01); *H04W 72/12* (2013.01)

(58) Field of Classification Search
CPC .. H04B 7/0626; H04B 7/0645; H04B 7/0632; H04B 7/063
USPC .............................................. 370/329, 310.2
See application file for complete search history.

(56) References Cited

U.S. PATENT DOCUMENTS

| | | | | |
|---|---|---|---|---|
| 2017/0374659 | A1* | 12/2017 | Hwang | H04W 72/0413 |
| 2018/0183508 | A1* | 6/2018 | Zhang | H04L 1/0618 |
| 2018/0255568 | A1* | 9/2018 | Takeda | H04W 72/1268 |
| 2018/0262250 | A1 | 9/2018 | Kim et al. | |
| 2018/0288750 | A1* | 10/2018 | Yu | H04L 1/0003 |
| 2019/0028240 | A1* | 1/2019 | Chen | H04L 1/1671 |
| 2019/0182857 | A1* | 6/2019 | Shen | H04L 1/1671 |
| 2019/0349919 | A1* | 11/2019 | Oh | H04W 72/1268 |
| 2020/0196290 | A1* | 6/2020 | Yu | H04W 72/042 |
| 2020/0214027 | A1* | 7/2020 | Tang | H04W 80/02 |

OTHER PUBLICATIONS

Extended European Search Report issued in counterpart European Patent Application No. 18853937.3, dated Apr. 13, 2021 (10 pages).
Qualcomm Incorporated; "On Type I and Type II CSI parameters encoding"; 3GPP TSG RAN WG1 #90, R1-1713397 Prague, Czech, Aug. 21-25, 2017 (5 pages).
Huawei, HiSilicon; "Details of CSI reporting on PUCCH/PUSCH"; 3GPP TSG RAN WG1 Meeting NR#3, R1-1715466; Nagoya, Japan, Sep. 18-21, 2017 (9 pages).

* cited by examiner

```
┌─────────────────────────────────────────────┐
│ Determining a RANK of a channel matrix       │
│ according to received indication information │──S601
└─────────────────────────────────────────────┘
                      │
                      ▼
┌─────────────────────────────────────────────┐
│ Jointly encoding initial control information │
│ used for RANKs of a plurality of channel     │
│ matrices according to the determined RANK    │──S602
│ of the channel matrix, to generate uplink    │
│ control information                          │
└─────────────────────────────────────────────┘
                      │
                      ▼
┌─────────────────────────────────────────────┐
│ Transmitting the uplink control information  │──S603
└─────────────────────────────────────────────┘
```

FIG. 6

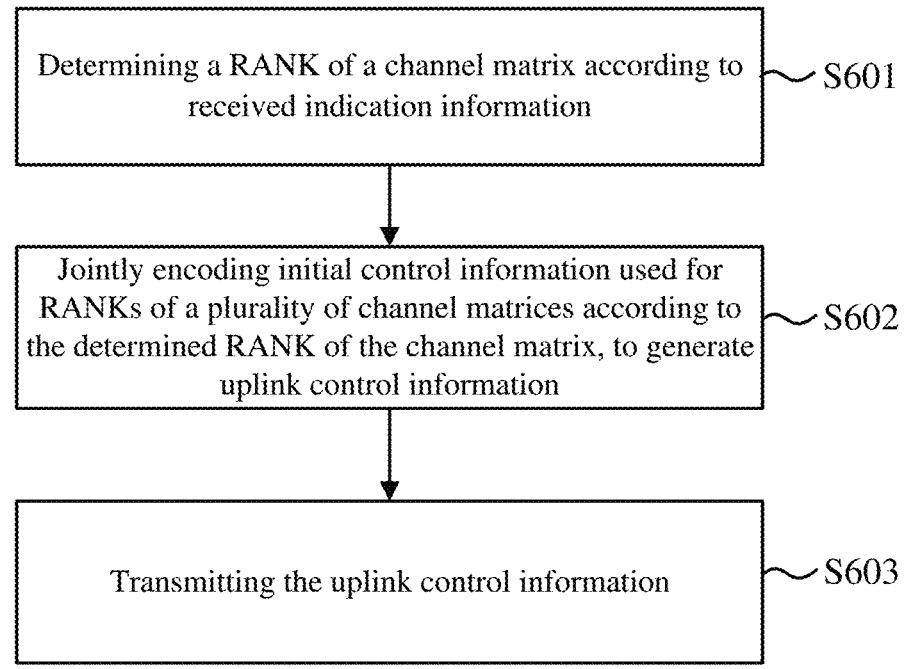

| | PMI states | CQI states | | Total states |
|---|---|---|---|---|
| RI=1 | 0-1023 | 0-15 | 0-49151 | |
| RI=2 | 1024-3071 | | | 0-81919 |
| RI=3 | 3072-4095 | 0-15 | | |
| RI=4 | 4096-5119 | | | 0-344063 |
| RI=5 | 5120-5631 | | | |
| RI=6 | 5632-6143 | 0-127 | | |
| RI=7 | 6144-6655 | | | |
| RI=8 | 6656-7167 | | | |

FIG. 7

METHOD FOR TRANSMITTING UPLINK CONTROL INFORMATION AND MOBILE STATION

This application is a 371 U.S. National Phase of International Application No. PCT/CN2018/094465, filed on Jul. 4, 2018, which claims priority to Chinese Application No. 201710809353.X, filed on Sep. 10, 2017. The entire disclosures of the above applications are incorporated herein by reference.

TECHNICAL FIELD

The present invention relates to a field of wireless communications, and in particular, to a method for transmitting uplink control information and a mobile station.

BACKGROUND

In a communication system, it becomes more and more important to measure spatial characteristics of a channel by a user terminal and to feed back a measurement result to a wireless base station in a form of channel state information (CSI). According to different channel states, a RANK of a channel matrix reported by the user terminal when performing CSI feedback may also be different, and accordingly, the number of bits required for performing CSI feedback is also different.

In an LTE system, due to a limited size of multiple input multiple output (MIMO) antennas, a difference between the number of bits of the CSI feedback is not large, and it will not cause a significant impact on the receiving side, that is, the base station. However, in a 5G NR (New Radio) system, as the size of the multiple input multiple output (MIMO) antennas increases, the difference between the number of bits of the CSI feedback also increases. However, according to a current uplink control information transmitting method, the base station in the 5G NR system cannot determine the number of bits included in the uplink control information which includes the CSI feedback.

SUMMARY OF THE INVENTION

According to one aspect of the present invention, a method for transmitting uplink control information is provided, comprising: adding padding bits to initial control information to generate uplink control information, where the initial control information includes first information having a same number of bits for RANKs of different channel matrices, and second information having a same or different number of bits for RANKs of different channel matrices; and transmitting the uplink control information.

According to another aspect of the present invention, a method for transmitting uplink control information is provided, comprising: transmitting length indication information that indicates a length of uplink control information, where the uplink control information includes first information having a same number of bits for RANKs of different channel matrices, and second information having a same or different number of bits for RANKs of different channel matrices; and transmitting the uplink control information in one time slot.

According to another aspect of the present invention, a method for transmitting uplink control information is provided, comprising: determining a RANK of a channel matrix according to received indication information; jointly encoding initial control information used for RANKs of a plurality of channel matrices according to determined RANK of the channel matrix, to generate uplink control information, where the initial control information of the RANK of each channel matrix includes first information having a same number of bits for RANKs of different channel matrices and second information having a same or different number of bits for RANKs of different channel matrices; and transmitting the uplink control information.

According to another aspect of the present invention, a method for transmitting uplink control information is provided, comprising: using a first resource to transmit first uplink control information at a first time-interval; and independent of the first uplink control information, using a second resource to transmit second uplink control information at a second time-interval, where at least one of the first uplink control information and the second uplink control information includes first information having a same number of bits for RANKs of different channel matrices and second information having a same or different number of bits for RANKs of different channel matrices.

According to another aspect of the present invention, a mobile station is provided, comprising: a transmitting unit configured to transmit length indication information that indicates a length of uplink control information, where the uplink control information includes first information having a same number of bits for RANKs of different channel matrices, and second information having a same or different number of bits for RANKs of different channel matrices, and the transmitting unit is further configured to transmit the uplink control information in one time slot.

According to another aspect of the present invention, a mobile station is provided, comprising: a determining unit configured to determine a RANK of a channel matrix according to received indication information; a generating unit configured to jointly encode initial control information used for RANKs of a plurality of channel matrices according to determined RANK of the channel matrix, to generate uplink control information, where the initial control information of the RANK of each channel matrix includes first information having a same number of bits for RANKs of different channel matrices, and second information having a same or different number of bits for RANKs of different channel matrices; and a transmitting unit configured to transmit the uplink control information.

According to another aspect of the present invention, a mobile station is provided, comprising: a transmitting unit configured to use a first resource to transmit first uplink control information at a first time-interval, and the transmitting unit is further configured to use a second resource to transmit the second uplink control information at a second time-interval, independent of the first uplink control information, and at least one of the first uplink control information and the second uplink control information includes first information having a same number of bits for RANKs of different channel matrices and second information having a same or different number of bits for RANKs of different channel matrices.

BRIEF DESCRIPTION OF THE DRAWINGS

The above and other objects, features, and advantages of the present invention will become clearer by describing embodiments of the present invention in detail with reference to accompanying drawings.

FIG. 6 is a flowchart showing a method for transmitting uplink control information according to another embodiment of the present invention.

FIG. 7 is a schematic diagram showing jointly encoding initial control information according to one embodiment of the present invention.

DESCRIPTION OF THE EMBODIMENTS

Figure 1:
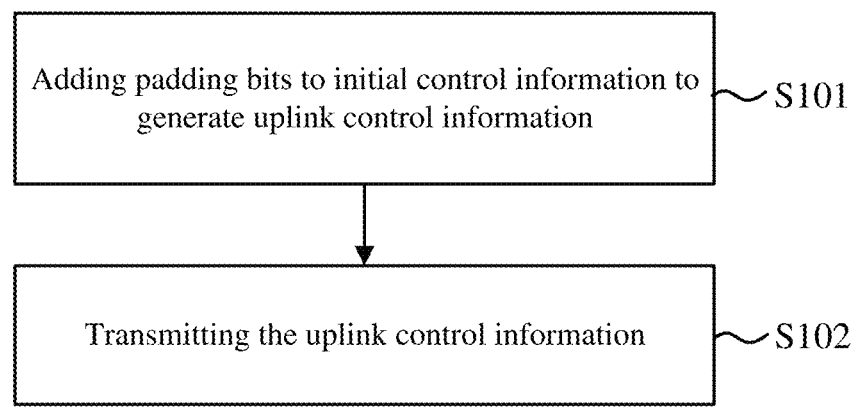
FIG. 1 is a flowchart showing a method for transmitting uplink control information according to one embodiment of the present invention.

A method for transmitting uplink control information and a mobile station according to an embodiment of the present invention will be described below with reference to the accompanying drawings. In the accompanying drawings, the same reference numerals represent the same elements throughout. It should be understood that embodiments described herein are merely illustrative and should not be construed as limiting the scope of the present invention. Furthermore, the UE described herein may include various types of user terminals, such as a mobile terminal (also referred to as a mobile station) or a fixed terminal, however, for convenience, the UE and the mobile station are sometimes used interchangeably in the following.

In the embodiments according to the present invention, uplink control information may only include channel state information (CSI). Alternatively, in the embodiments according to the present invention, in addition to the channel state information (CSI), the uplink control information may further include other control information such as HARQ feedback information and the like.

Hereinafter, a method for transmitting uplink control information according to one embodiment of the present invention is described with reference to FIG. 1. FIG. 1 shows a flowchart of a method 100 for transmitting the uplink control information.

As shown in FIG. 1, in step S101, padding bits are added to initial control information to generate the uplink control information. Here, the initial control information may be initial control information of the uplink control information to be transmitted in one time slot. Furthermore, the initial control information in step S101 may include first information having a same number of bits for RANKs of different channel matrices and second information having a same or different number of bits for RANKs of different channel matrices. For example, the first information may include a RANK indicator (RI) and/or a CSI-RS resource indicator (CRI) and the like, and the second information includes a channel quality indicator (CQI) and/or a precoding matrix indicator (PMI) and the like.

Figure 2:
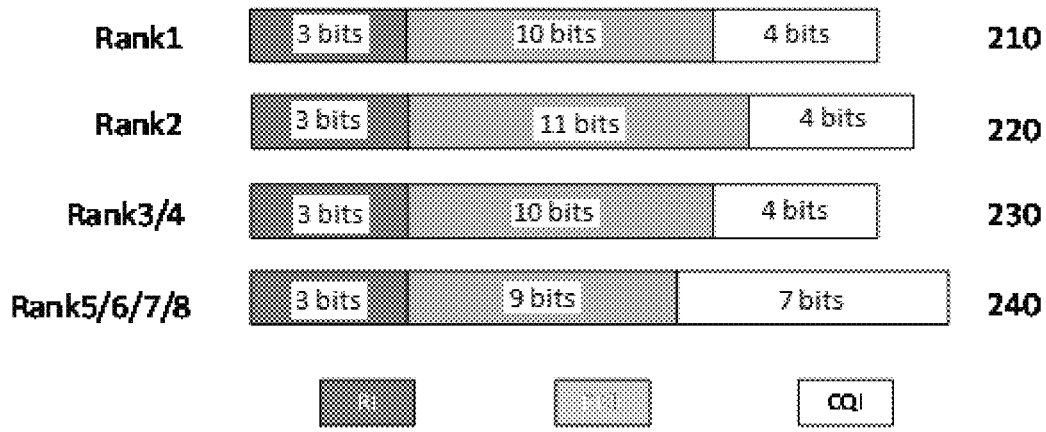
FIG. 2 shows a schematic diagram of channel state information (CSI) included in initial control information according to one embodiment of the present invention.

FIG. 2 shows a schematic diagram of channel state information (CSI) included in the initial control information according to one embodiment of the present invention. In an example shown in FIG. 2, when a RANK of a channel matrix is 1, corresponding CSI is CSI 210; when the RANK is 2, the corresponding CSI is CSI 220; when the RANK is 3 or 4, the corresponding CSI is CSI 230; when the RANK is any of 5 to 8, the corresponding CSI is CSI 240. As shown in FIG. 2, CSI 210 to 240 all includes RI, CQI and PMI. For any of RANKs 1 to 8, the RIs have the same number of bits, that is, 3 bits. On the other hand, when the RANK has different values, the CQI and PMI may have different numbers of bits. For example, when the RANK is 1, the PMI has 10 bits. When the RANK is 2, the PMI has 11 bits. For another example, when the RANK is 3 or 4, the CQI has 4 bits. When the RANK is 5 to 8, the CQI has 7 bits.

In the example shown in FIG. 2, the total number of bits included in the CSI may be different for different RANKs. Specifically, the CSI 210-240 may have 17 bits, 18 bits, 17 bits, and 19 bits, respectively. In this case, the number of bits of the uplink control information including CSI also changes with a value of the RANK.

Returning to FIG. 1, in step S101, uplink control information having a predetermined number of bits may be generated by adding padding bits to the initial control information. For example, it may be determined in advance that the uplink control information should have X bits. Padding bits may be added to the initial control information, so that the uplink control information has X bits regardless of the value of the RANK.

Figure 3:
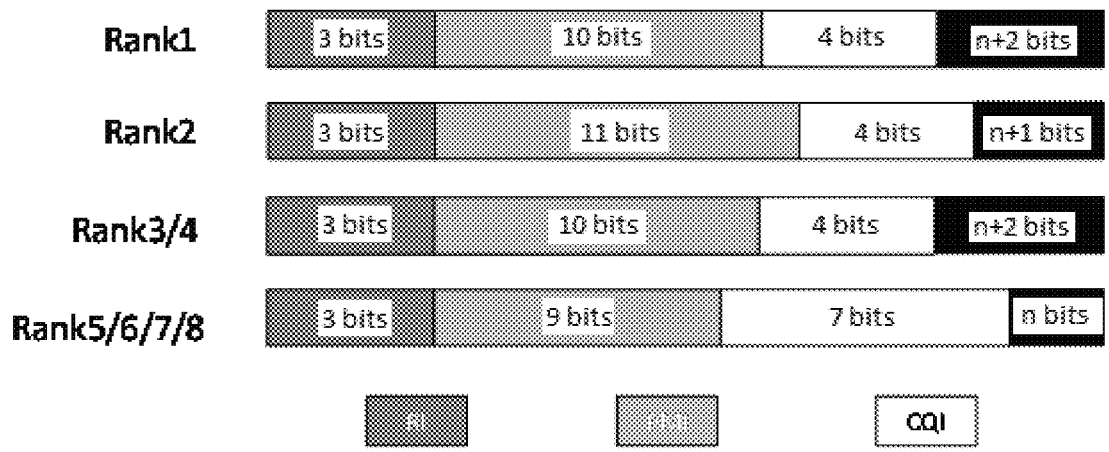
FIG. 3 is a schematic diagram showing adding padding bits to the initial control information shown in FIG. 2 according to one embodiment of the present invention.

FIG. 3 is a schematic diagram showing adding padding bits to the initial control information shown in FIG. 2 according to one embodiment of the present invention. As shown in FIG. 3, suppose that when the RANK is 5 to 8, n bits are required to be added so that the uplink control information reaches X bits, then, when the RANK is 1, n+2 bits are required to be added so that the uplink control information reaches X bits; when the RANK is 2, n+1 bits are required to be added so that the uplink control information reaches X bits; when the RANK is 3 or 4, n+2 bits are required to be added so that the uplink control information reaches X bits, where X is an integer greater than 0, and n is an integer greater than or equal to 0.

In the example shown in FIG. 3, the padding bits are added to the uplink control information as a whole. Alternatively, according to another example of the present invention, each of the first information and the second information in the initial control information includes one or more segments, and in step S101, the padding bits may be added to at least part of the one or more segments separately. For example, the first information and the second information may include respective segments corresponding to different parameters such as RI, PMI, CQI and the like. The padding bits may be added separately for one or more of these segments.

Figure 4:
FIG. 4 is a schematic diagram showing adding padding bits to the initial control information shown in FIG. 2 according to another embodiment of the present invention.

FIG. 4 is a schematic diagram illustrating adding padding bits to the initial control information shown in FIG. 2 according to another embodiment of the present invention. The initial control information shown in FIG. 2 may include an RI segment, a PMI segment and a CQI segment. Bit padding may be performed on the RI segment, PMI segment and CQI segment. As shown in FIG. 4, a-bits may be padded to the RI segment, b-bits may be padded to the PMI segment, and c-bits may be padded to the CQI segment. Alternatively, bit padding may be performed on only a part of the segments. For example, in the example shown in FIG. 4, b-bits are padded to the PMI segment and c-bits are added to the CQI segment, without padding the RI segment with a-bits (as shown by the dashed box in FIG. 4).

Furthermore, according to another example of the present invention, in addition to the CSI information, the initial control information may further include other information such as hybrid automatic repeat request (HARQ) information. In this case, padding bits may be added separately for the CSI information and the HARQ information. Here, the CSI information may be a bit sequence in which a plurality of parameters such as RI, PMI and CQI are jointly encoded, or a bit sequence in which segments corresponding to the parameters respectively are included.

In the example according to the present invention, the padding bits added in step S101 are used to check the uplink control information. For example, the padding bits may be used for cyclic redundancy check (CRC) of the uplink control information. In this case, the base station may perform a blind check on the CRC in the uplink control information transmitted by the UE. For another example, the padding bits may be used for parity check of the uplink control information.

For example, as described above, the padding bits may be added to the uplink control information as a whole. The padding bits added to the uplink control information as a whole may be used for cyclic redundancy check of the entire uplink control information. For another example, as described above, the padding bits may be added separately to at least part of one or more segments in the initial control information, and the added padding bits may be used for cyclic redundancy check of the segment. Furthermore, in a case where the padding bits are separately added to at least part of one or more segments in the initial control information, the padding bits may also be added for cyclic redundancy check of the entire uplink control information.

Furthermore, according to another example of the present invention, the padding bits added in step S101 may indicate at least part of the first information in the initial control information. For example, the RANK indicator (RI) or part of the RANK indicator (RI) in the first information may be used as the padding bits.

Furthermore, according to one example of the present invention, bit padding may be performed before carrying out channel coding on the initial control information. Specifically, in step S101, the padding bits may be added to the initial control information to generate a padding bit sequence, and channel coding may be carried out on the padding bit sequence to generate the uplink control information. Alternatively, bit padding may also be performed when performing channel coding on the initial control information.

The generated uplink control information is transmitted in step S102. For example, the generated uplink control information may be transmitted on an uplink channel such as a physical uplink control channel (PUCCH) or a physical uplink shared channel (PUSCH). Furthermore, the generated uplink control information may be transmitted in one time slot.

In the method for transmitting uplink control information shown in FIG. 1, the uplink control information may have a specific number of bits by adding the padding bits to the initial control information. Therefore, even if the length of the uplink control information is not notified to the base station, the base station can determine the length of the uplink control information according to the determined specific number of bits.

Figure 5:
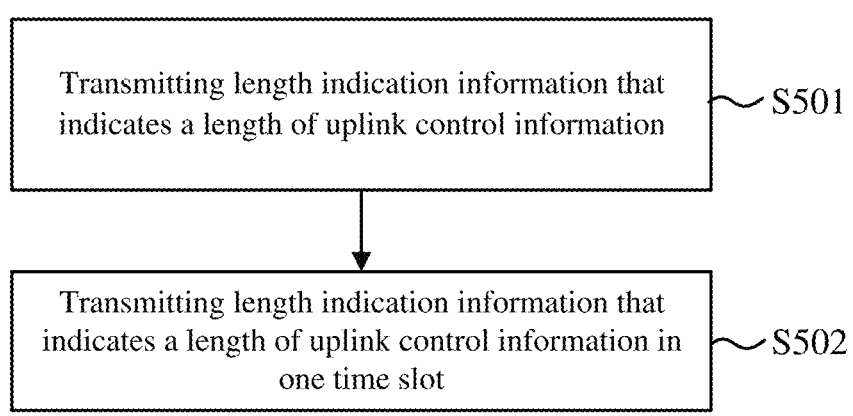
FIG. 5 is a flowchart showing a method for transmitting uplink control information according to another embodiment of the present invention.

According to another embodiment of the present invention, a length of uplink control information may be notified to a base station through length indication information, so that the base station determines the length of the uplink control information. Hereinafter, a method for transmitting uplink control information according to another embodiment of the present invention is described with reference to FIG. 5. FIG. 5 shows a flowchart of a method 500 for transmitting the uplink control information.

As shown in FIG. 5, in step S501, length indication information that indicates a length of the uplink control information is transmitted, where the uplink control information includes first information having a same number of bits for RANKs of different channel matrices and second information having a same or different number of bits for RANKs of different channel matrices. Here, the initial control information may be initial control information of the uplink control information to be transmitted in one time slot.

According to one example of the present invention, part of information in a demodulation reference signal (DMRS) may be used as the length indication information. For example, a scrambling code sequence of the DMRS may be used as the length indication information to indicate the length of the uplink control information.

Then, in step S502, the uplink control information is transmitted in one time slot, the length of the uplink control information is indicated by the length indication information. For example, the generated uplink control information may be transmitted on an uplink channel such as a physical uplink control channel (PUCCH) or a physical uplink shared channel (PUSCH). Therefore, the base station may determine the length of the uplink control information received in one subframe through the length indication information, and may not need to add the padding bits.

Furthermore, according to another embodiment of the present invention, a base station may notify a mobile station of information about a RANK of a channel matrix. In this case, the base station may anticipate a length of uplink control information to be returned by the mobile station according to the information notified to the mobile station, without the need to notify to the base station through length indication information. Hereinafter, a method for transmitting uplink control information according to another embodiment of the present invention is described with reference to FIG. 6. FIG. 6 shows a flowchart of a method 600 for transmitting the uplink control information.

As shown in FIG. 6, in step S601, the RANK of the channel matrix is determined according to the received indication information. According to one example of the present invention, the number of supported spatial layers may be determined according to higher level signaling transmitted by the base station, and thus the RANK of the channel matrix is determined.

In step S602, initial control information for RANKs of a plurality of channel matrices may be jointly encoded according to the determined RANK of the channel matrix to generate the uplink control information, where the initial control information of the RANK of each channel matrix includes first information having a same number of bits for RANKs of different channel matrices and second information having a same or different number of bits for RANKs of different channel matrices.

For example, when it is determined in step S601 that the RANK of the channel matrix is RANKs 1-2, in step S602, initial control information corresponding to RANK 1 and initial control information corresponding to RANK 2 may be jointly encoded, where each of the initial control information corresponding to RANK 1 and the initial control information corresponding to RANK 2 may include the first information (for example, RI) having the same number of bits for RANKs of different channel matrices and the second information (for example, PMI or CQI) having the same or different number of bits for RANKs of different channel matrices. For another example, when it is determined in step S601 that the RANK of the channel matrix is RANKs 1-8, in step S602, the initial control information respectively corresponding to the RANK 1-8 may be jointly encoded.

FIG. 7 is a schematic diagram showing jointly encoding the initial control information according to one embodiment of the present invention. As shown in FIG. 7, when the initial control information respectively corresponding to RANKs 1-2 is jointly encoded, the uplink control information may have 49151 states, and the mobile station needs to use 16 bits to indicate the state of specific uplink control information. Therefore, when the base station can notify the mobile station of information about the RANK of the channel matrix being RANKs 1-2, it may be anticipated that the length of the uplink control information is 16 bits. When the initial control information respectively corresponding to RANKs 1-4 is jointly encoded, the uplink control information may have 81919 states, and the mobile station needs to use 17 bits to indicate the state of the specific uplink control information. Therefore, when the base station can notify the mobile station of information about the RANK of the channel matrix being RANKs 1-4, it may be anticipated that the length of the uplink control information is 17 bits. When the initial control information respectively corresponding to RANKs 1-8 is jointly encoded, the uplink control information may have 344063 states, and the mobile station needs to use 19 bits to indicate the state of the specific uplink control information. Therefore, when the base station can notify the mobile station of information about the RANK of the channel matrix being RANKs 1-8, it may be anticipated that the length of the uplink control information is 19 bits.

In order to reduce the number of bits for transmitting control information, according to one example of the present invention, codebooks supported in a communication system may be down-sampled. In other words, the number of codebooks that need to be represented in the uplink control information is reduced. Preferably, a predetermined threshold may be set between $2^n$ and $2^{(n+1)}$. When the number of states required to be represented for the uplink control information is between $2^n$ and $2^{(n+1)}$ and less than the predetermined threshold, the codebooks may be down-sampled to reduce the number of codebooks that need to be represented in the uplink control information, so that the uplink control information is transmitted with fewer bits.

Returning to FIG. 6, then, in step S603, the uplink control information is transmitted. For example, the generated uplink control information may be transmitted on an uplink channel such as a physical uplink control channel (PUCCH) or a physical uplink shared channel (PUSCH). Furthermore, the generated uplink control information may be transmitted in one time slot.

In the examples described above with reference to FIGS. 1-7, the length of the uplink control information may be determined by means of padding bits, transmitting the length indication information, or determining the RANK of the channel matrix according to the received indication information. Alternatively, in order to reduce the control signaling that needs to be transmitted, the mobile station or base station may not perform the above operations, but may transmit the uplink control information directly. In this case, the base station may blindly decode the uplink control information transmitted by the mobile station to determine its length.

Furthermore, transmitting periods of the uplink control information may be different for different cases. For example, in some cases, the mobile station may need to transmit the uplink control information with a period of 5 ms. While in other cases, the mobile station may need to transmit the uplink control information with a period of 20 ms. In this case, if only one group of uplink control information resources (also referred to as "resource group") is configured, unnecessary uplink control information transmission may be caused. Therefore, according to another example of the present invention, multiple groups of resources may be configured to transmit the uplink control information respectively.

Figure 8:
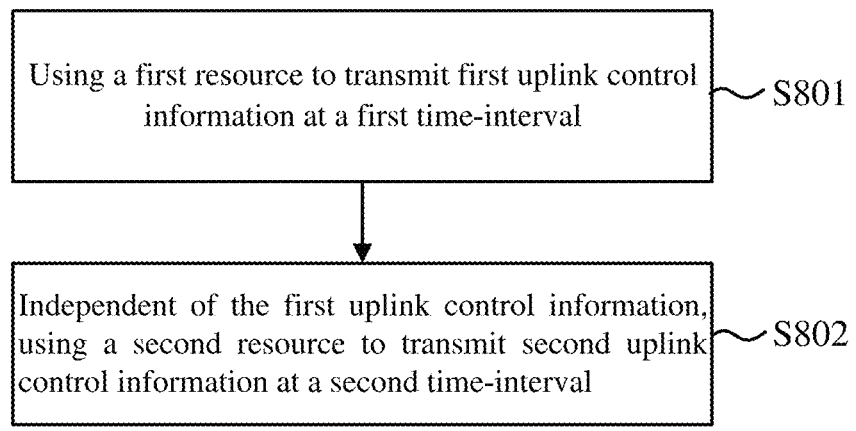
FIG. 8 is a flowchart showing a method for transmitting uplink control information according to another embodiment of the present invention.

Hereinafter, a method for transmitting uplink control information according to another embodiment of the present invention is described with reference to FIG. 8. FIG. 8 shows a flowchart of a method 800 for transmitting the uplink control information. As shown in FIG. 8, in step S801, a first resource (also referred to as "first resource group") is used to transmit first uplink control information at a first time-interval, and in step S802, independent of the first uplink control information, a second resource (also referred to as "second resource group") is used to transmit second uplink control information at a second time-interval. According to one example of the present invention, at least one of the first uplink control information and the second uplink control information includes first information having a same number of bits for RANKs of different channel matrices and second information having a same or different number of bits for RANKs of different channel matrices. For example, the first uplink control information may include the first information having the same number of bits for RANKs of different channel matrices, and the second uplink control information may include the first information having the same number of bits for RANKs of different channel matrices, and the second information having the same or different number of bits for RANKs of different channel matrices. For another example, both the first uplink control information and the second uplink control information may include the first information having the same number of bits for RANKs of different channel matrices, and the second information having the same or different number of bits for RANKs of different channel matrices.

Figure 9:
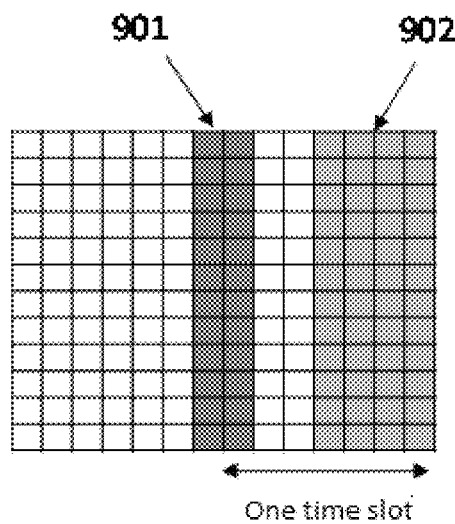
FIG. 9 is a schematic diagram showing a first resource and a second resource configured according to one embodiment of the present invention.

Furthermore, for example, the first resource and the second resource may be configured in one time slot. FIG. 9 is a schematic diagram showing the first resource and the second resource configured according to one embodiment of the present invention. As shown in FIG. 9, the first resource 901 and the second resource 902 may be located in different areas in a resource pool corresponding to one time slot. A small square in FIG. 9 may represent one symbol. The first resource 901 is used to transmit the first uplink control information, and the second resource 902 is used to transmit the second uplink control information. Because the transmitting periods of the first uplink control information and the second uplink control information are different, in some time slots, only the first uplink control information may be transmitted according to the configured first resource, and in some time slots, not only the first uplink control information may be transmitted according to the configured first resource, but the second uplink control information may also be transmitted according to the configured second resource.

When both the first uplink control information and the second uplink control information are transmitted in one subframe, initial information of the first uplink control information and initial information of the second uplink control information may be independently encoded to obtain mutually independent first uplink control information and second uplink control information. On the other hand, when the first uplink control information and/or the second uplink control information includes a plurality of segments or information, the above operations such as padding bits and joint encoding described in conjunction with FIGS. 1-7 may be performed inside the first uplink control information and/or the second uplink control information. For example, padding bits may be added to the initial control information of the first uplink control information to generate the first uplink control information. For another example, joint encoding may be performed on each piece of information in the second uplink control information. The operations such as padding bits and joint encoding have been described in detail in conjunction with FIGS. 1-7, and therefore are not repeated here.

According to one example of the present invention, the first uplink control information may be uplink control information for wideband communication. The second uplink control information may be uplink control information for subband communication, and vice versa.

Figure 10:
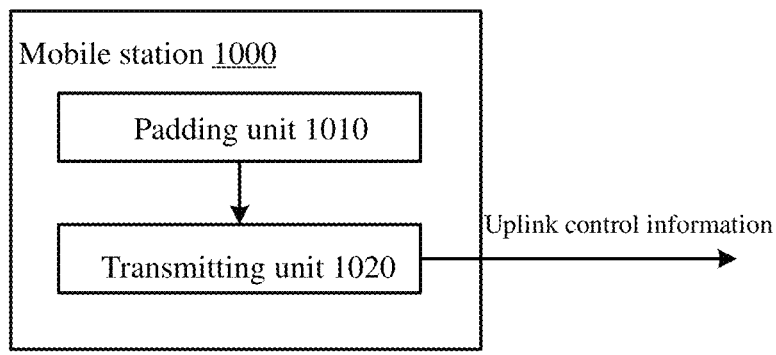
FIG. 10 shows a block diagram of a mobile station according to one embodiment of the present invention.

Hereinafter, a mobile station according to one embodiment of the present invention will be described with reference to FIG. 10. FIG. 10 shows a block diagram of a mobile station 1000 according to one embodiment of the present invention. As shown in FIG. 10, the mobile station 1000 includes a padding unit 1010 and a transmitting unit 1020. In addition to these two units, the mobile station 1000 may further include other components. However, since these components are not related to the content of the embodiment of the present invention, an illustration and description thereof are omitted here. Furthermore, since specific details of the following operations performed by the mobile station 1000 according to the embodiment of the present invention are the same as those described above with reference to FIGS. 1-4, repeated descriptions of the same details are omitted here to avoid repetition.

The padding unit 1010 may add padding bits to initial control information to generate uplink control information. Here, the initial control information may be initial control information of the uplink control information to be transmitted in one time slot. In addition, the initial control information may include first information having a same number of bits for RANKs of different channel matrices and second information having a same or different number of bits for RANKs of different channel matrices. For example, the first information may include a RANK indicator (RI) and/or a CSI-RS resource indicator (CRI) and the like, and the second information includes a channel quality indicator (CQI) and/or a precoding matrix indicator (PMI) and the like.

The padding unit 1010 may generate uplink control information having a predetermined number of bits by adding padding bits to the initial control information. For example, it may be determined in advance that the uplink control information should have X bits. Padding bits may be added to the initial control information, so that the uplink control information has X bits regardless of the value of the RANK.

According to one example of the present invention, the padding unit 1010 may add the padding bits to the uplink control information as a whole. Alternatively, according to another example of the present invention, each of the first information and the second information in the initial control information includes one or more segments. The padding unit 1010 may add the padding bits to at least part of the one or more segments separately. For example, the first information and the second information may include respective segments corresponding to different parameters such as RI, PMI, CQI and the like. The padding bits may be added separately for one or more of these segments. Specifically, the padding unit 1010 may add the padding bits for each segment. Alternatively, the padding unit 1010 may perform bit padding on only part of the segments.

Furthermore, according to another example of the present invention, in addition to the CSI information, the initial control information may further include other information such as hybrid automatic repeat request (HARQ) information. In this case, the padding unit 1010 may add padding bits separately for the CSI information and the HARQ information. Here, the CSI information may be a bit sequence in which a plurality of parameters such as RI, PMI and CQI are jointly encoded, or a bit sequence in which segments corresponding to the parameters respectively are included.

In the example according to the present invention, the padding bits added by the padding unit 1010 are used to check the uplink control information. For example, the padding bits may be used for cyclic redundancy check (CRC) of the uplink control information. In this case, the base station may perform a blind check on the CRC in the uplink control information transmitted by the UE. For another example, the padding bits may be used for parity check of the uplink control information.

For example, as described above, the padding bits may be added to the uplink control information as a whole. The padding bits added to the uplink control information as a whole may be used for cyclic redundancy check of the entire uplink control information. For another example, as described above, the padding bits may be added separately to at least part of one or more segments in the initial control information, and the added padding bits may be used for cyclic redundancy check of the segment. Furthermore, in a case where the padding bits are separately added to at least part of one or more segments in the initial control information, the padding unit 1010 may also add the padding bits for cyclic redundancy check of the entire uplink control information.

Furthermore, according to another example of the present invention, the padding bits added by the padding unit 1010 may indicate at least part of the first information in the initial control information. For example, the RANK indicator (RI) or part of the RANK indicator (RI) in the first information may be used as the padding bits.

Furthermore, according to one example of the present invention, bit padding may be performed before carrying out channel coding on the initial control information. Specifically, the mobile station may further include a coding unit (not shown). The padding unit 1010 may add the padding bits to the initial control information to generate a padding bit sequence. Then, the coding unit may perform channel coding on the padding bit sequence to generate the uplink control information. Alternatively, the padding unit 1010 may perform bit padding when performing channel coding on the initial control information.

Then, the transmitting unit 1020 transmits the generated uplink control information. For example, the transmitting unit 1020 may transmit the generated uplink control information on an uplink channel such as a physical uplink control channel (PUCCH) or a physical uplink shared channel (PUSCH). Furthermore, the transmitting unit 1020 may transmit the generated uplink control information in one time slot.

Figure 11:
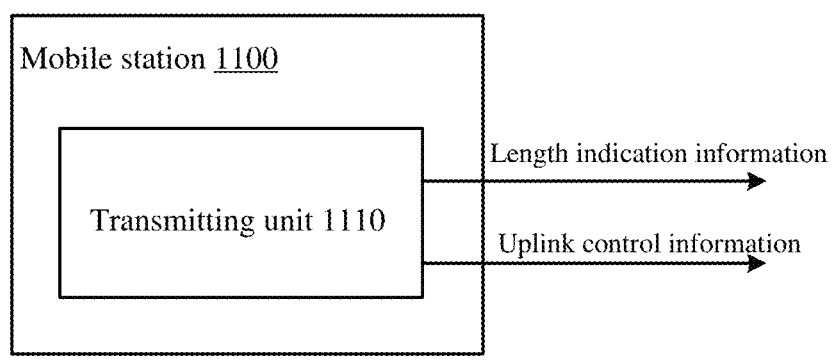
FIG. 11 shows a block diagram of a mobile station according to another embodiment of the present invention.

The uplink control information may have a specific number of bits, with the mobile station shown in FIG. 10 adding the padding bits to the initial control information. Therefore, even if the length of the uplink control information is not notified to the base station, the base station can determine the length of the uplink control information according to the determined specific number of bits According to another embodiment of the present invention, a mobile station may notify a base station of a length of uplink control information through length indication information, so that the base station determines the length of the uplink control information. Hereinafter, a mobile station according to another embodiment of the present invention will be described with reference to FIG. 11. FIG. 11 shows a block diagram of the mobile station 1100 according to another embodiment of the present invention. As shown in FIG. 11, the mobile station 1100 includes a transmitting unit 1110. In addition to the transmitting unit 1110, the mobile station 1100 may further include other components. However, since these components are not related to the content of the embodiment of the present invention, an illustration and description thereof are omitted here. Furthermore, since the specific details of the following operations performed by the mobile station 1100 according to the embodiment of the present invention are the same as those described above with reference to FIG. 5, repeated descriptions of the same details are omitted here to avoid repetition.

As shown in FIG. 11, the transmitting unit 1110 transmits the length indication information that indicates a length of the uplink control information, where the uplink control information includes first information having a same number of bits for RANKs of different channel matrices and second information having a same or different number of bits for RANKs of different channel matrices. Here, the initial control information may be initial control information of the uplink control information to be transmitted in one time slot.

According to one example of the present invention, part of information in a demodulation reference signal (DMRS) may be used as the length indication information. For example, a scrambling code sequence of the DMRS may be used as the length indication information to indicate the length of the uplink control information.

Then, the transmitting unit 1110 transmits the uplink control information in one time slot, the length of the uplink control information is indicated by the length indication information. For example, the generated uplink control information may be transmitted on an uplink channel such as a physical uplink control channel (PUCCH) or a physical uplink shared channel (PUSCH). Therefore, the base station may determine the length of the uplink control information received in one subframe through the length indication information, and may not need to add the padding bits.

Figure 12:
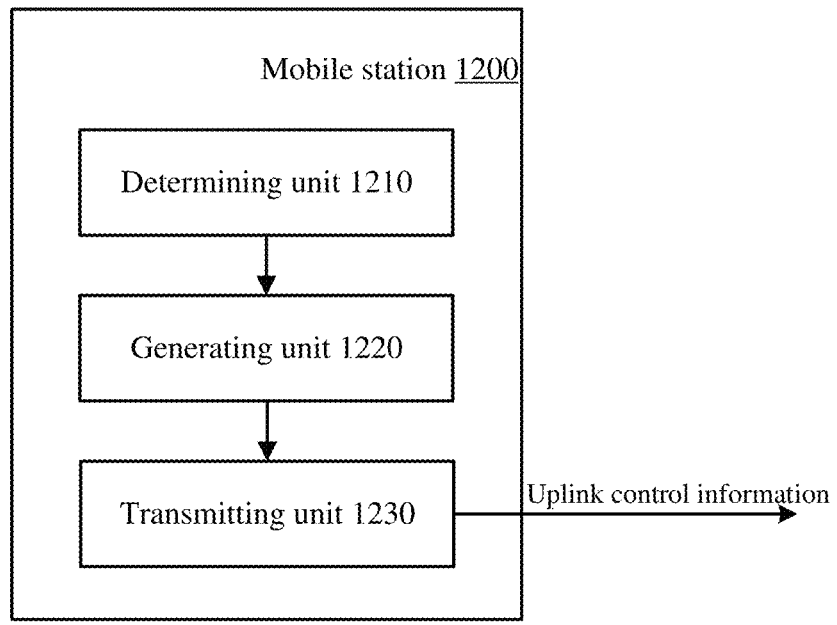
FIG. 12 shows a block diagram of a mobile station according to another embodiment of the present invention.

Furthermore, according to another embodiment of the present invention, a base station may notify a mobile station of information about a RANK of a channel matrix. In this case, the base station may anticipate a length of uplink control information to be returned by the mobile station according to the information notified to the mobile station, without the need to notify to the base station through length indication information. Hereinafter, a mobile station according to another embodiment of the present invention will be described with reference to FIG. 12. FIG. 12 shows a block diagram of the mobile station 1200 according to another embodiment of the present invention. As shown in FIG. 12, the mobile station 1200 includes a determining unit 1210, a generating unit 1220 and a transmitting unit 1230. In addition to the three units shown in FIG. 12, the mobile station 1200 may further include other components. However, since these components are not related to the content of the embodiment of the present invention, an illustration and description thereof are omitted here. Furthermore, since the specific details of the following operations performed by the mobile station 1200 according to the embodiment of the present invention are the same as those described above with reference to FIGS. 6-7, repeated descriptions of the same details are omitted here to avoid repetition.

In the example shown in FIG. 12, the determining unit 1210 determines the RANK of the channel matrix according to the received indication information. According to one example of the present invention, the number of supported spatial layers may be determined according to higher level signaling transmitted by the base station, and thus the RANK of the channel matrix is determined.

The generating unit 1220 may jointly encode initial control information for RANKs of a plurality of channel matrices according to the determined RANK of the channel matrix to generate the uplink control information, where the initial control information of the RANK of each channel matrix includes first information having a same number of bits for RANKs of different channel matrices and second information having a same or different number of bits for RANKs of different channel matrices.

For example, when the determining unit 1210 determines that the RANK of the channel matrix is RANKs 1-2, the generating unit 1220 may jointly encode initial control information corresponding to RANK 1 and initial control information corresponding to RANK 2, where each of the initial control information corresponding to RANK 1 and the initial control information corresponding to RANK 2 may include the first information (for example, RI) having the same number of bits for RANKs of different channel matrices and the second information (for example, PMI or CQI) having the same or different number of bits for RANKs of different channel matrices. For another example, when the determining unit 1210 determines that the RANK of the channel matrix is RANKs 1-8, the generating unit 1220 may perform joint encoding on the initial control information corresponding to the RANKs 1-8 respectively.

In order to reduce the number of bits for transmitting control information, according to one example of the present invention, codebooks supported in a communication system may be down-sampled. In other words, the number of codebooks that need to be represented in the uplink control information is reduced. Preferably, a predetermined threshold may be set between $2^n$ and $2^{(n+1)}$. When the number of states required to be represented for the uplink control information is between $2^n$ and $2^{(n+1)}$ and less than the predetermined threshold, a sampling unit in the mobile station may down-sample the codebooks to reduce the number of codebooks that need to be represented in the uplink control information, so that the uplink control information is transmitted with fewer bits.

Then, the transmitting unit 1230 may transmit the uplink control information. For example, the generated uplink control information may be transmitted on an uplink channel such as a physical uplink control channel (PUCCH) or a physical uplink shared channel (PUSCH). Furthermore, the generated uplink control information may be transmitted in one time slot.

In the examples described above with reference to FIGS. 10-12, the length of the uplink control information may be determined by means of padding bits, transmitting the length indication information, or determining the RANK of the channel matrix according to the received indication information. Alternatively, in order to reduce the control signaling that needs to be transmitted, the mobile station or base station may not perform the above operations, and the uplink control information may be directly transmitted by the transmitting unit of the mobile station. In this case, the base station may blindly decode the uplink control information transmitted by the mobile station to determine its length.

Furthermore, transmitting periods of the uplink control information may be different for different cases. For example, in some cases, the mobile station may need to transmit the uplink control information with a period of 5 ms. While in other cases, the mobile station may need to transmit the uplink control information with a period of 20 ms. In this case, if only one group of uplink control information resources (also referred to as "resource group") is configured, unnecessary uplink control information transmission may be caused. Therefore, according to another example of the present invention, multiple groups of resources may be configured to transmit the uplink control information respectively.

Figure 13:
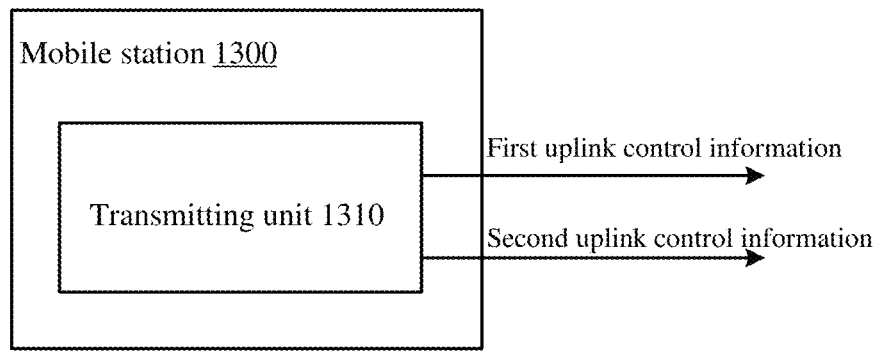
FIG. 13 shows a block diagram of a mobile station according to another embodiment of the present invention.

Hereinafter, a mobile station according to another embodiment of the present invention is described with reference to FIG. 13. FIG. 13 shows a block diagram of the mobile station 1300 according to another embodiment of the present invention. As shown in FIG. 13, the mobile station 1300 includes a transmitting unit 1310. In addition to the transmitting unit 1310 shown in FIG. 13, the mobile station 1300 may further include other components. However, since these components are not related to the content of the embodiment of the present invention, an illustration and description thereof are omitted here. Furthermore, since the specific details of the following operations performed by the mobile station 1300 according to the embodiment of the present invention are the same as those described above with reference to FIGS. 8-9, repeated descriptions of the same details are omitted here to avoid repetition.

As shown in FIG. 8, the transmitting unit 1310 uses a first resource (also referred to as "first resource group") to transmit first uplink control information at a first time-interval, and independent of the first uplink control information, the transmitting unit 1310 uses a second resource (also referred to as "second resource group") to transmit second uplink control information at a second time-interval. According to one example of the present invention, at least one of the first uplink control information and the second uplink control information includes first information having a same number of bits for RANKs of different channel matrices and second information having a same or different number of bits for RANKs of different channel matrices. For example, the first uplink control information may include the first information having the same number of bits for RANKs of different channel matrices, and the second uplink control information may include the first information having the same number of bits for RANKs of different channel matrices, and the second information having the same or different number of bits for RANKs of different channel matrices. For another example, both the first uplink control information and the second uplink control information may include the first information having the same number of bits for RANKs of different channel matrices, and the second information having the same or different number of bits for RANKs of different channel matrices.

Furthermore, for example, the first resource and the second resource may be configured in one time slot. Because the transmitting periods of the first uplink control information and the second uplink control information are different, in some time slots, the transmitting unit 1310 may only transmit the first uplink control information according to the configured first resource, and in some time slots, the transmitting unit 1310 may not only transmit the first uplink control information according to the configured first resource, but may also transmit the second uplink control information according to the configured second resource.

The mobile station may further include a coding unit (not shown). When the transmitting unit 1310 transmits both the first uplink control information and the second uplink control information in one subframe, the coding unit may independently encode initial information of the first uplink control information and initial information of the second uplink control information to obtain mutually independent first uplink control information and second uplink control information. On the other hand, the mobile station may further include a padding unit. When the first uplink control information and/or the second uplink control information includes a plurality of segments or information, the coding unit and the padding unit may perform the above operations such as padding bits and joint encoding described in conjunction with FIGS. 1-7 inside the first uplink control information and/or the second uplink control information. For example, the padding unit may add padding bits to the initial control information of the first uplink control information to generate the first uplink control information. For another example, the coding unit may jointly encode each piece of information in the second uplink control information. The operations such as padding bits and joint encoding have been described in detail in conjunction with FIGS. 1-7, and therefore are not repeated here.

According to one example of the present invention, the first uplink control information may be uplink control information for wideband communication. The second uplink control information may be uplink control information for subband communication, and vice versa.

<Hardware>

Figure 14:
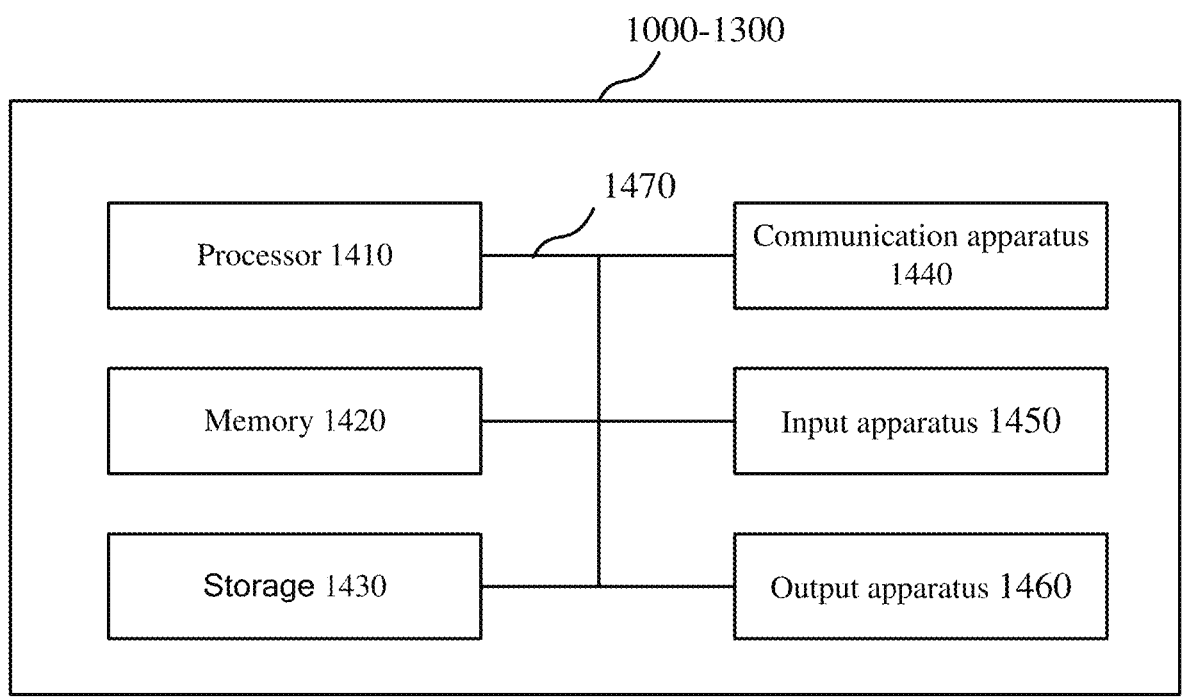
FIG. 14 is a diagram showing an example of a hardware construction of a mobile station involved in one embodiment of the present invention.

For example, the radio base station, user terminal, and the like in the embodiment of the present invention can function as a computer that executes processing of the wireless communication method of the present invention. FIG. 14 is a diagram illustrating an example of a hardware configuration of a related mobile station according to an embodiment of the present invention. Any one of the mobile stations 1000 to 1300 described above may be physically designed as a computer apparatus including a processor 1410, a memory 1420, a storage 1430, a communication apparatus 1440, an input apparatus 1450, an output apparatus 1460, and a bus 1470 and the like.

It should be noted that, in the following description, the word "apparatus" may be replaced by "circuit", "device", "unit" and so on. It should be noted that the hardware structure of a mobile station 1400 may be designed to include one or more of each apparatus shown in the drawings, or may be designed not to include part of the apparatus.

For example, although only one processor 1410 is shown, a plurality of processors may be provided. Furthermore, processes may be implemented with one processor, or processes may be implemented either simultaneously or in sequence, or in different manners, on two or more processors. It should be noted that the processor 1410 may be implemented with one or more chips.

Each function of the mobile station 1400 is implemented by reading predetermined software (program) on hardware such as the processor 1410 and the memory 1420, so as to make the processor 1410 perform calculations, and by controlling the communication carried out by the communication apparatus 1440, and the reading and/or writing of data in the memory 1420 and the storage 1430.

The processor 1410 may control the whole computer by, for example, running an operating system. The processor 1410 may be configured with a central processing unit (CPU), which includes interfaces with peripheral apparatus, control apparatus, computing apparatus, a register and so on. For example, the padding unit 1010, the determining unit 1210, the generating unit 1220, and the encoding unit described above may be implemented by the processor 1410.

Furthermore, the processor 1410 reads programs (program codes), software modules or data, from the storage 1430 and/or the communication apparatus 1440, into the memory 1420, and executes various processes according to these. As for the programs, programs to allow computers to execute at least part of the operations of the above-described embodiments may be used.

The memory 1420 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1420 may be referred to as a "register", a "cache", a "main memory" (primary storage apparatus) and so on. The memory 1420 can store executable programs (program codes), software modules and so on for implementing the wireless communication methods according to embodiments of the present invention.

The storage 1430 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1430 may be referred to as "secondary storage apparatus."

The communication apparatus 1440 is hardware (transmitting/receiving device) for allowing inter-computer communication by using wired and/or wireless networks, and may be referred to as, for example, a "network device", a "network controller", a "network card", a "communication module" and so on. The communication apparatus 1440 may be configured to include a high frequency switch, a duplexer, a filter, a frequency synthesizer and so on in order to realize, for example, frequency division duplex (FDD) and/or time division duplex (TDD). For example, the transmitting unit 710, receiving unit 810, etc. described above may be implemented by the communication apparatus 1440.

The input apparatus 1450 is an input device for receiving input from the outside (for example, a keyboard, a mouse, a microphone, a switch, a button, a sensor and so on). The output apparatus 1460 is an output device for allowing sending output to the outside (for example, a display, a speaker, an LED (Light Emitting Diode) lamp and so on). It should be noted that the input apparatus 1450 and the output apparatus 1460 may be provided in an integrated structure (for example, a touch panel).

Furthermore, these pieces of apparatus, including the processor 1410, the memory 1420 and so on are connected by the bus 1470 so as to communicate information. The bus 1470 may be formed with a single bus, or may be formed with buses that vary between pieces of apparatus.

Also, the mobile station 1400 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1410 may be installed with at least one of these pieces of hardware.

<Variant>

In addition, it should be noted that the terms illustrated in the present specification and/or the terms required for the understanding of the present specification may be substituted with terms having the same or similar meaning. For example, a channel and/or a symbol may be a signal. In addition, the signal may be a message. A reference signal may be abbreviated as an "RS (Reference Signal)", and may be referred to as a "pilot", a "pilot signal" and so on, depending on which standard applies. In addition, a component carrier (CC) may be referred to as a carrier frequency, a cell, or the like.

In addition, the wireless frame may be composed of one or more periods (frames) in the time domain. Each of the one or more periods (frames) constituting the wireless frame may also be referred to as a subframe. Further, a subframe may be composed of one or more slots in the time domain. The subframe may be a fixed length of time duration (eg, 1 ms) that is independent of the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Furthermore, the slot may also be a time unit configured based on parameter. Furthermore, a slot may also include multiple microslots. Each microslot may be comprised of one or more symbols in the time domain. Furthermore, a microslot may also be referred as "a subframe".

A wireless frame, a subframe, a slot, a microslot and a symbol all represent the time unit when transmitting signals. A wireless frame, a subframe, a slot, a microslot and a symbol may also use other names that correspond to each other. For example, one subframe may be referred to as a "transmission time interval (TTI)", and a plurality of consecutive subframes may also be referred to as a "TTI", and one slot or one microslot may also be referred to as a "TTI." That is, a subframe and/or a TTI may be a subframe (1 ms) in existing LTE, may be a shorter period than 1 ms (for example, one to thirteen symbols), or may be a longer period of time than 1 ms. It should be noted that a unit indicating a TTI may also be referred to as a slot, a microslot, or the like instead of a subframe.

Here, a TTI refers to the minimum time unit of scheduling in wireless communication, for example. For example, in LTE systems, a wireless base station schedules the wireless resources (such as the frequency bandwidth and transmission power that can be used in each user terminal) to allocate to each user terminal in TTI units. It should be noted that the definition of TTIs is not limited to this.

TTIs may be channel-coded data packets (transport blocks), code blocks, and/or codeword transmission time units, or may be the unit of processing in scheduling, link adaptation and so on. It should be noted that, when a TTI is given, the time interval (e.g., the number of symbols) actually mapped to the transport block, code block, and/or codeword may also be shorter than the TTI.

It should be noted that, when one slot or one microslot is called a TTI, more than one TTI (i.e., more than one slot or more than one microslot) may also become the scheduled minimum time unit. Furthermore, the number of slots (the number of microslots) constituting the minimum time unit of the scheduling may be controlled.

A TTI having a time duration of 1 ms may be referred to as a "normal TTI" (TTI in LTE Rel. 8 to 12), a "standard TTI", a "long TTI", a "normal subframe", a "standard subframe", or a "long subframe", and so on. A TTI that is shorter than a normal TTI may be referred to as a "shortened TTI", a "short TTI", a "partial (or fractional) TTI", a "shortened subframe", a "short subframe", a "microslot", or a "short microslot" and so on.

It should be noted that, a long TTI (eg, a normal TTI, a subframe, etc.) may be replaced with a TTI having a time duration exceeding 1 ms, and a short TTI (eg, a shortened TTI, and so on) may also be replaced with a TTI having a TTI duration shorter than the long TTI and a TTI duration exceeding 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one microslot, one subframe or one TTI duration. One TTI and one subframe each may be comprised of one or more resource blocks, respectively. It should be noted that one or more RBs may also be referred to as a "physical resource block (PRB (Physical RB))", a "Sub-Carrier Group (SCG)", a "Resource Element Group (REG)", a "PRG pair", an "RB pair" and so on.

Also, a resource block may also be composed of one or more resource elements (RE). For example, one RE can be a wireless resource area of a subcarrier and a symbol.

It should be noted that the above-described structures of wireless frames, subframes, slots, microslots and symbols and so on are simply examples. For example, configurations such as the number of subframes included in a wireless frame, the number of slots of each subframe or wireless frame, the number or microslots included in a slot, the number of symbols and RBs included in a slot or microslot, the number of subcarriers included in an RB, the number of symbols in a TTI, the symbol duration and the cyclic prefix (CP) duration can be variously changed.

Also, the information and parameters and so on described in this specification may be represented in absolute values or in relative values with respect to predetermined values, or may be represented in corresponding other information. For example, radio resources may be indicated by predetermined indices. In addition, equations to use these parameters and so on may be used, apart from those explicitly disclosed in this specification.

The names used for parameters and so on in this specification are not limited in any respect. For example, since various channels (PUCCH (Physical Uplink Control Channel), PDCCH (Physical Downlink Control Channel) and so on) and information elements can be identified by any suitable names, the various names assigned to these various channels and information elements are not limited in any respect.

The information, signals and so on described in this specification may be represented by using any one of various different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on that are input and/or output may be overwritten, updated or appended. The information, signals and so on that are output may be deleted. The information, signals and so on that are input may be transmitted to other apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

It should be noted that physical layer signaling may also be referred to as L1/L2 (Layer 1/Layer 2) control information (L1/L2 control signals), L1 control information (L1 control signal) and so on. Also, RRC signaling may be referred to as "RRC messages", and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, a reporting "X") does not necessarily have to be carried out explicitly, and can be carried out implicitly (by, for example, not reporting this piece of information, or by reporting a different piece of information).

Regarding decisions, which may be made in values represented by one bit (0 or 1), may be made by a true or false value (Boolean value) represented by true or false, or may be made by comparing numerical values (for example, comparison against a predetermined value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are included in the definition of communication media.

The terms "system" and "network" as used herein are used interchangeably.

In the present specification, the terms "radio base station (BS)", "radio base station", "eNB", "gNB", "cell", "sector", "cell group", "carrier" and "component carrier" may be used interchangeably. A radio base station may be referred to as a "fixed station", "NodeB", "eNodeB (eNB)", "access point", "transmission point", "receiving point", "femto cell", "small cell" and so on.

A radio base station can accommodate one or more (for example, three) cells (also referred to as "sectors"). When a radio base station accommodates a plurality of cells, the entire coverage area of the radio base station can be partitioned into a plurality of smaller areas, and each smaller area can provide communication services with radio base station subsystems (for example, indoor small radio base stations (RRHs (Remote Radio Heads))). The term "cell" or "sector" refers to part or all of the coverage area of a radio base station and/or a radio base station subsystem that provides communication services within this coverage.

In the present specification, the terms "mobile station (MS)", "user terminal", "user equipment (UE)" and "terminal" may be used interchangeably. The radio base station is sometimes referred to by terms such as a fixed station, a NodeB, a eNodeB (eNB), an access point, an transmitting point, a receiving point, a femto cell, and small cell, and the like.

A mobile station is also sometimes used by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)).

Likewise, the user terminals in this specification may be interpreted as radio base stations.

In the present specification, it is assumed that certain actions to be performed by radio base station may, in some cases, be performed by its higher node (upper node). In a network comprised of one or more network nodes with base stations, it is clear that various operations that are performed to communicate with terminals can be performed by radio base stations, one or more network nodes (for example, MMEs (Mobility Management Entities), S-GW (Serving-Gateways), and so on may be possible, but these are not limiting) other than radio base stations, or combinations of these.

The respective aspects/embodiments illustrated in this specification may be used individually or in combinations, which may also be switched and used during execution. The order of processes, sequences, flowcharts and so on of the respective aspects/embodiments described in the present specification may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000 (Code Division Multiple Access), UMB (Ultra Mobile Broadband), IEEE 802.11 (Wi-Fi (registered trademark)), IEEE 802.16 (WiMAX (registered trademark)), IEEE 920.20, UWB (Ultra-WideBand), Bluetooth (registered trademark) and other adequate radio communication methods, and/or next-generation systems that are enhanced based on these.

The phrase "based on" as used in this specification does not mean "based only on", unless otherwise specified. In other words, the phrase "based on" means both "based only on" and "based at least on."

Any reference to elements with designations such as "first", "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "including", "comprising" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

What is claimed is:

1. A terminal, comprising:
a control unit configured to generate uplink control information, wherein the uplink control information includes first information and second information, and the first information has a same number of bits for RANKs of different channel matrices; and
a transmitting unit configured to transmit the uplink control information,
wherein the first information includes a RANK indicator and a CSI-RS resource indicator, and the second information includes a channel quality indicator and a precoding matrix indicator.

2. A method performed by a terminal, comprising:
generating uplink control information, wherein the uplink control information includes first information and second information, and the first information has a same number of bits for RANKs of different channel matrices; and
transmitting the uplink control information,
wherein the first information includes a RANK indicator and a CSI-RS resource indicator, and the second information includes a channel quality indicator and a precoding matrix indicator.

3. A base station, comprising:
a receiving unit configured to receive uplink control information, wherein the uplink control information includes first information and second information; and
a control unit configured to determine the first information has a same number of bits for RANKs of different channel matrices,
wherein the first information includes a RANK indicator and a CSI-RS resource indicator, and the second information includes a channel quality indicator and a precoding matrix indicator.

4. A system comprising a terminal and a base station, wherein
the terminal comprises:
a control unit configured to generate uplink control information, wherein the uplink control information includes first information and second information, and the first information has a same number of bits for RANKs of different channel matrices; and
a transmitting unit configured to transmit the uplink control information; and
the base station comprises:
a receiving unit configured to receive the uplink control information,
wherein the first information includes a RANK indicator and a CSI-RS resource indicator, and the second information includes a channel quality indicator and a precoding matrix indicator.

* * * * *